(12) United States Patent
Chen et al.

(10) Patent No.: US 6,219,737 B1
(45) Date of Patent: Apr. 17, 2001

(54) READ REQUEST PERFORMANCE OF A MULTIPLE SET BUFFER POOL BUS BRIDGE

(75) Inventors: Wen-Tzer Thomas Chen, Austin, TX (US); Richard A. Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,134

(22) Filed: Dec. 10, 1998

(51) Int. Cl.[7] ....................................................... G06F 13/14
(52) U.S. Cl. .......................... 710/129; 710/128; 710/107; 710/52
(58) Field of Search ........................................ 710/129, 128, 710/263, 101, 112, 107, 100, 2, 52, 21, 3, 113, 240, 241; 711/100; 712/225; 370/401, 402, 911; 709/213, 217, 235, 238, 101

(56) References Cited

U.S. PATENT DOCUMENTS

| | | | |
|---|---|---|---|
| 5,546,546 | 8/1996 | Bell et al. ............................. | 395/292 |
| 5,613,075 | 3/1997 | Wade et al. ........................... | 395/287 |
| 5,673,399 | 9/1997 | Guthrie et al. ....................... | 395/308 |
| 5,694,556 | 12/1997 | Neal et al. ............................ | 395/308 |
| 5,761,454 | 6/1998 | Adusumilli et al. ................. | 395/306 |
| 5,774,681 | 6/1998 | Kunishige ............................ | 395/308 |
| 5,802,055 | * 9/1998 | Krein et al. . | |
| 5,881,253 | * 3/1999 | Seeman . | |
| 5,915,104 | * 6/1999 | Miller . | |
| 5,964,859 | * 10/1999 | Steinbach et al. . | |

* cited by examiner

*Primary Examiner*—Gopal C. Ray
(74) *Attorney, Agent, or Firm*—Joseph P. Lally; Leslie A. Van Leeuwen

(57) ABSTRACT

A bus bridge coupled between primary and secondary busses including a buffer pool with first and second buffer sets and steering logic configured to direct transactions received from first and second peripheral devices to the first and second buffer sets respectively. The bridge is configured to push posted memory write transactions posted in the first buffer set onto the primary bus ahead of and in response to a read request transaction from the first peripheral device while leaving transactions in the second buffer set unaffected. In one embodiment, the steering logic is configured to receive first and second grant signals produced by arbitration logic of the bridge. The first and second grant signals indicate mastership of the secondary bus and the source of a subsequent transaction to be received via the secondary bus. The bridge and the secondary bus are suitably compliant with the PCI protocol. The primary bus may be the host bus of a processor unit or a peripheral bus such as a PCI bus. The invention further contemplates a computer system including processor, a bus bridge as described coupled to the processor via a primary bus, a system memory, and first and second peripheral devices coupled to the bridge via a secondary bus. The bridge is configured to push posted memory write transactions stored in the first buffer set onto the primary bus ahead of a read request from the first peripheral device without affecting transactions stored in the second buffer set. The bridge is preferably configured to arbitrate mastership of the secondary bus among the peripheral devices in response to first and second request signals received by the bridge from the first and second peripheral devices respectively.

20 Claims, 5 Drawing Sheets

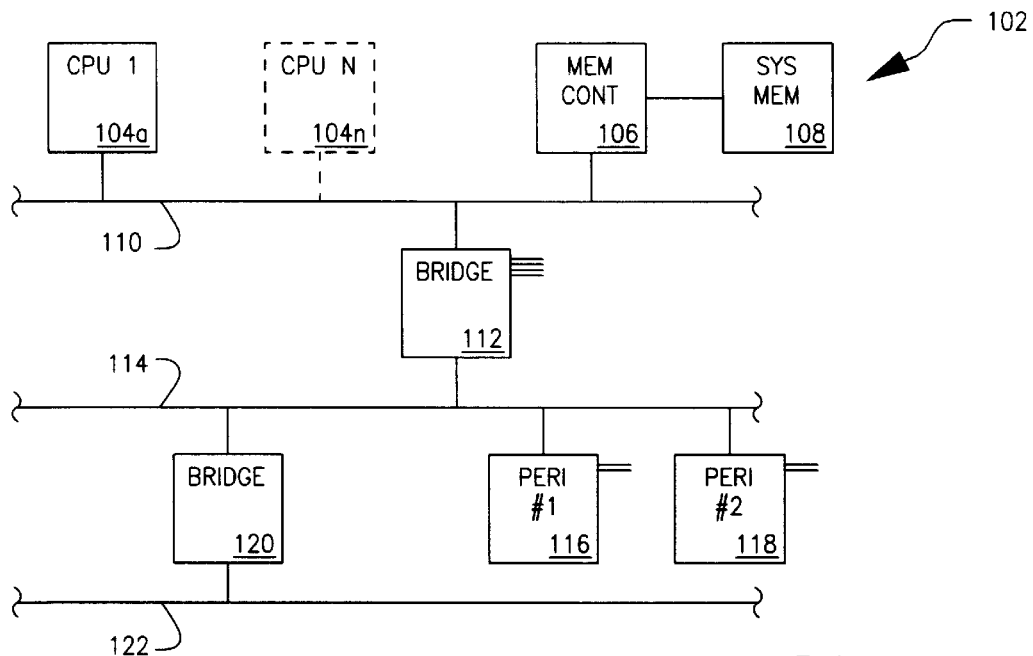
FIG. 1
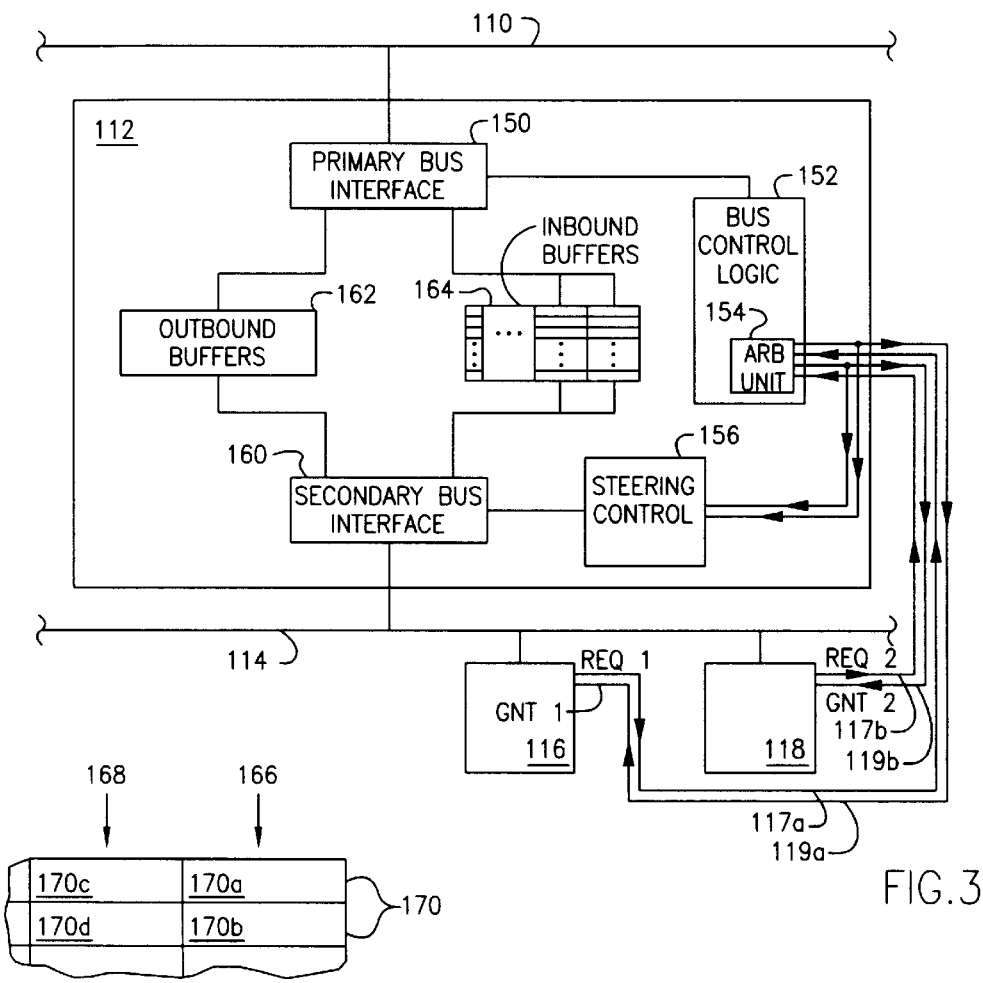
FIG. 3
FIG. 4

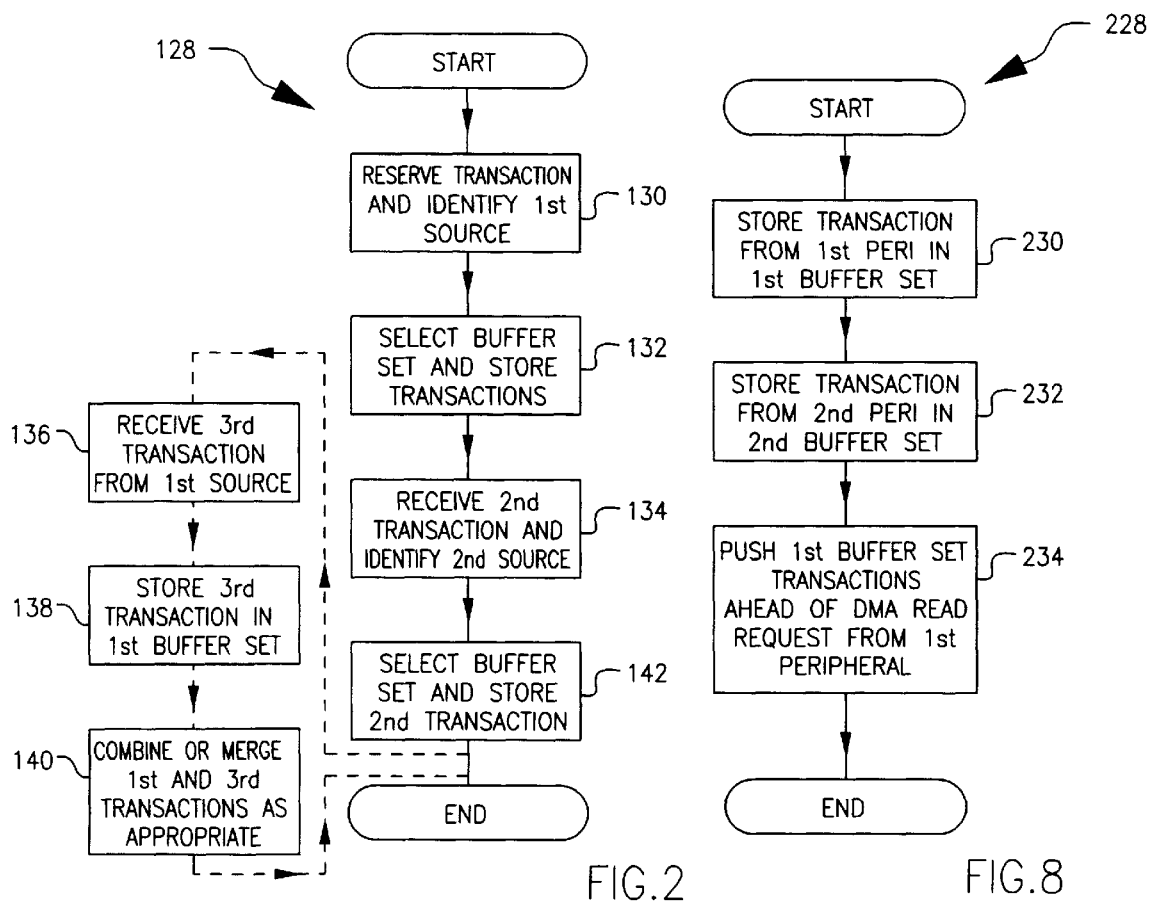
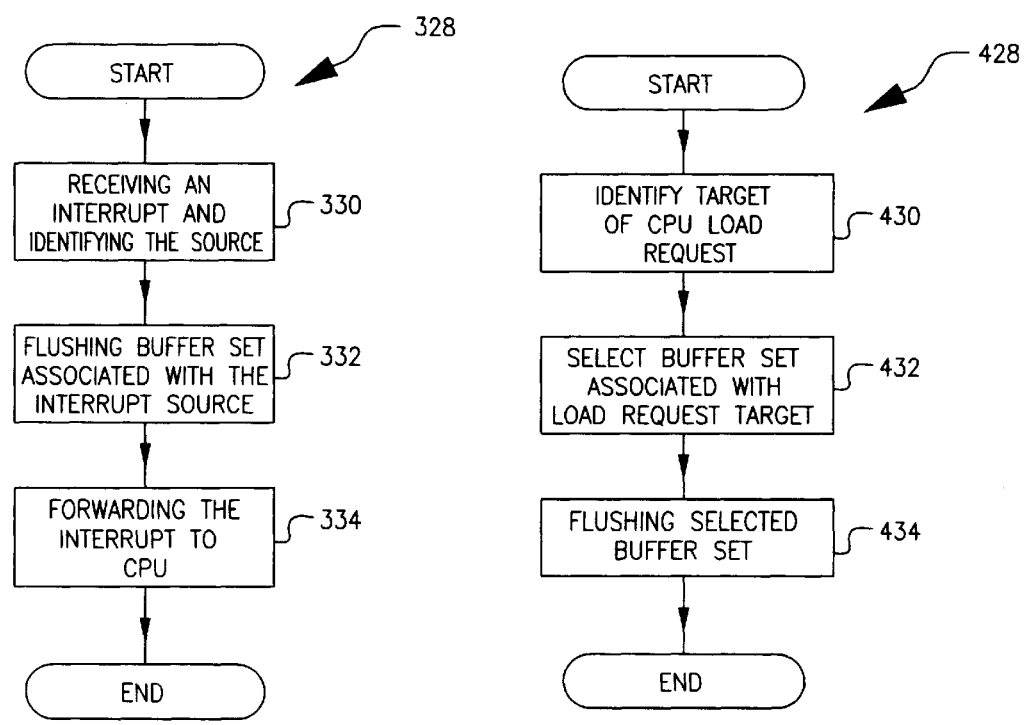
FIG.2  FIG.8  FIG.11  FIG.14

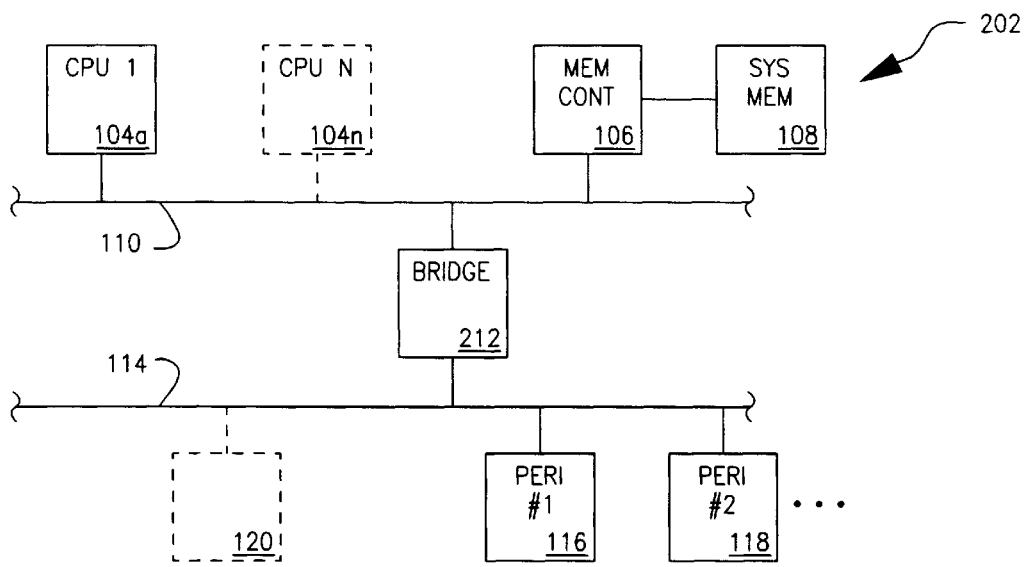
FIG.5
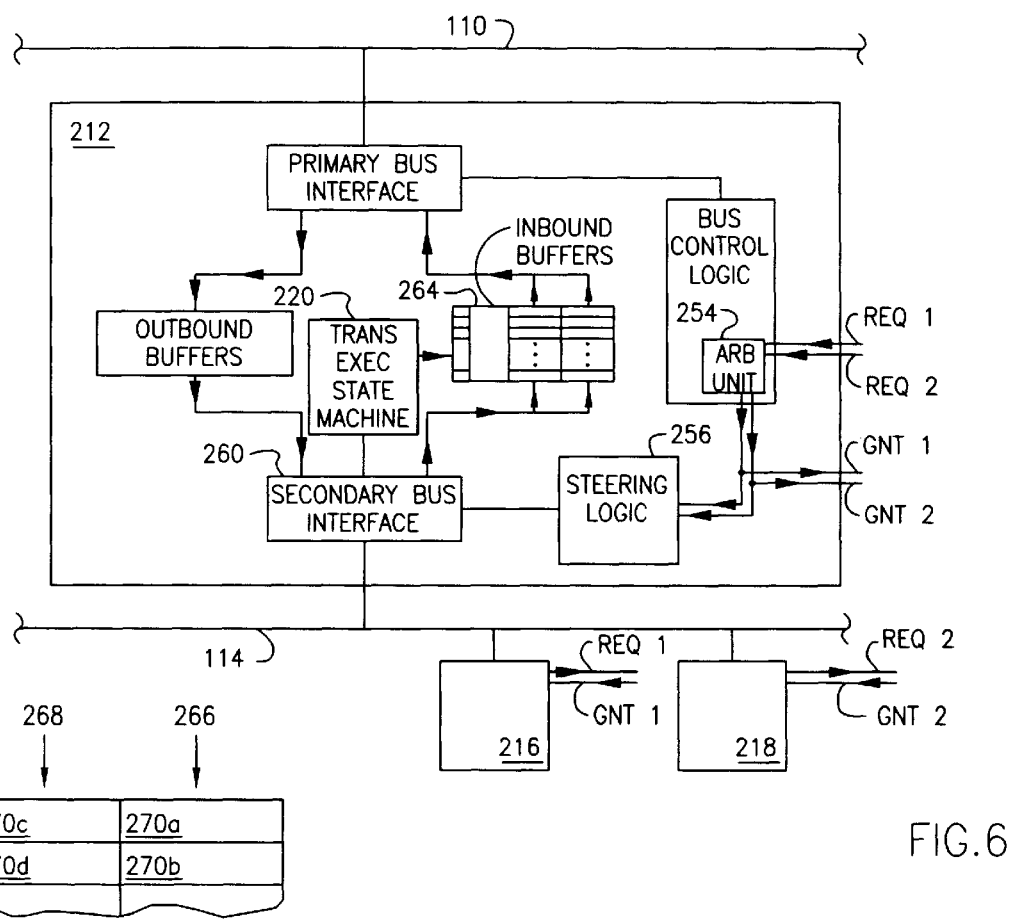
FIG.6
FIG.7

READ REQUEST PERFORMANCE OF A MULTIPLE SET BUFFER POOL BUS BRIDGE

CROSS REFERENCE TO RELATED APPLICATIONS

The present invention is related to the subject matter of the following U.S. Patent applications: Chen et al., Partial Pulling of Buffered Transactions in Multiple Set Buffer Pool Bus Bridge, Ser. No. 09/210,135; filed Dec. 10, 1998 Chen et al., Transaction Merging with Multiple Set Buffer Pool Bus Bridge, Ser. No. 09/210,127 filed Dec. 10, 1998; and Chen et al., Interrupt Response in a Multiple Set Buffer Pool Bus Bridge, Ser. No. 09/210,133 filed Dec. 10, 1998, all filed on the filing date of this application.

BACKGROUND

1. Field of the Present Invention

The present invention generally relates to the field of microprocessor based computers and more particularly to organizing and managing buffers in a bus bridge to improve the performance of a computing system.

2. History of Related Art

Microprocessor based computer systems typically employ a variety of adapters or peripheral devices to provide extended capabilities to the system and to decrease the processing load required of the central processor or processors. As computing systems continue to increase in performance and complexity, the number of peripheral devices has increased commensurately often necessitating the use of multiple layers of peripheral busses to accommodate all of the required peripheral devices and to provide expansion capacity to the system user. Typically, specialized circuits or devices generally referred to as bus bridges provide the functionality required to enable the various busses within a system to communicate information. The increased importance of peripheral devices in modem computers, from the simplest consumer oriented machines to high end enterprise systems, has generated increased attention to the performance of peripheral busses and bus bridges. Increasing the number of instructions a central processor can execute per second results in only a marginal increase in system performance if the system's bus bridges and peripheral busses are operating at their performance limits. Typically, however, the ability to improve bus bridge performance is constrained by compatibility concerns. Accommodating the large base of peripheral devices designed according to a preexisting bus specification limits the ability to make changes to any bus bridge design. Accordingly, improvements to a particular bus bridge design should, to the greatest extent possible, be compatible with existing bus protocols.

Because bus bridges may be coupled between busses operating at different clock frequencies or between a bus that is currently accessible and a bus that is busy, bridges routinely implement a pool of storage buffers for temporarily storing transactions in transit from one bus to another. Each storage buffer is typically configured to store any of a variety of transactions. Some bus bridges, such as bridges compliant with the PCI specification, include the capability to merge or combine transactions. Such capabilities, however, are all too commonly underutilized because the buffer pool organization of conventionally designed bridges coupled with constraints imposed by the bus specifications prevent or significantly diminish the opportunities to take advantage of the combining or merging capabilities of the bridge. Moreover, conventional bridge designs and buffer pool organizations in which transactions are stored in a common pool can unnecessarily hamper performance of commonly invoked procedures such as interrupt handling routines by failing to associate buffered transactions with their sources. Without information concerning the origin of buffered transactions, many common procedures are forced, under the constraints of the relevant bus specification, to account for each transaction in the buffer pool, regardless of whether a given transaction is relevant to the procedure. Accordingly, it is highly desirable to implement a bus bridge designed to take greater advantage of opportunities to combine buffered transactions and improve the efficiency of commonly invoked procedures such as interrupt handling while maintaining compatibility with existing bus specifications and protocols.

SUMMARY OF THE INVENTION

The problems identified above are in large part addressed by a system and bus bridge design in which the bridge's buffer pool is organized into multiple buffer sets and configured to associate each buffer set with a corresponding peripheral device. With this organization, the source of buffered transactions can be maintained without requiring tag bits or other information that is not in compliance with existing bus specifications. The source information can be utilized beneficially to improve the performance and reduce overhead associated with a variety of tasks and routines.

Broadly speaking, a first application of the present invention contemplates a bus bridge including a buffer pool and steering logic. The buffer pool is organized as a plurality of buffer sets including at least a first and second buffer set. The steering logic is adapted to store transactions originating from a first peripheral device to the first buffer set and transactions originating from a second peripheral device to the second buffer set thereby preserving origin information associated with each buffered transaction. In one embodiment, the transactions arrive via a secondary bus, such as a PCI bus, coupled to the bus bridge. The bridge is suitably adapted for combining two or more transactions within each buffer set to produce a single transaction. Each buffer set preferably includes one or more buffers for temporarily storing transactions arriving from the secondary bus and bound for a primary bus that is coupled to the bus bridge through bus interface logic. The primary bus may comprise a host bus connected to one or more processors. Alternatively, the primary bus may comprise an additional PCI bus or other peripheral bus.

The first application of the present invention further contemplates a computer system including at least one processor, a bridge coupled to the processor via a host bus, and a plurality of peripheral devices including first and second peripheral devices coupled to the bridge via a secondary bus. The bridge includes a pool of buffer sets including a first buffer set and a second buffer set. The bridge includes steering logic configured to store transactions into buffer sets associated with the peripheral device corresponding to the transaction such that first device transactions are stored in the first buffer set, second device transactions stored in the second buffer set, and so forth. In one embodiment, the bridge is configured to receive first and second request signals from the first and second peripheral devices respectively. The bridge preferably further includes arbitration logic for arbitrating mastership of the secondary bus in response to the request signals. The bridge is preferably configured to produce at least first and second grant signals for the first and second peripheral devices respectively to indicate mastership of the secondary bus. In this embodiment, the steering logic is suitably configured to receive the first and second grant signals and to determine therefrom the source of a subsequent transaction.

The first application of the present invention still further contemplates a method of buffering transactions in a bus bridge according to the source of the transaction. A first transaction is received and a first peripheral device identified as its source. In response to identifying the first peripheral device as the source of the first transaction, a first buffer set is selected and the first transaction stored in the first buffer set such that the source of the first transaction is indicated by the presence of the first transaction within the first buffer set. Similarly, a second transaction from a second peripheral device is received and its source identified. A second buffer set is then selected and the second transaction stored in the second buffer set. In an embodiment emphasizing the combining of transactions, additional transactions are received and stored in the appropriate buffer sets. Combining of transactions within a buffer set may then proceed without affecting the contents of the remaining buffer sets. In this manner, a third transaction received from the first peripheral device could be stored in the first buffer set and combined, if appropriate, with the first transaction without regard to transactions in other buffer sets, such as the second transaction in the second buffer set. Combining occurs when multiple sequential memory write transactions are combined into a single bus transaction. I/O performance is improved with multiple buffer sets organized based on bus grant level by making transactions flowing through one buffer set essentially unaffected by transactions flowing through another buffer set. Thus, additional write combining and merging is facilitated.

A second application of the present invention contemplates a bus bridge coupled between primary and secondary busses. The bridge includes a buffer pool with first and second buffer sets and steering logic configured to direct transactions received from first and second peripheral devices to the first and second buffer sets respectively. The bridge is configured to push posted memory write transactions posted in the first buffer set onto the primary bus ahead of and in response to receiving a read request transaction from the first peripheral device while allowing transactions in the second buffer set to be unaffected. In this manner the execution time of read requests is independent of the contents of the buffer sets not associated with the peripheral device that issued the read request. In one embodiment, the steering logic is configured to receive first and second grant signals produced by arbitration logic of the bridge. The first and second grant signals indicate the source of a subsequent transaction to be received via the secondary bus. The transactions pushed ahead of and in response to the read request transaction may be previous posted memory write transactions while the bridge and the secondary bus are suitably compliant with the PCI protocol. The primary bus may be the host bus of a processor unit or a peripheral bus such as a PCI bus. The bridge further allows relaxed transaction ordering rules compared to conventional PCI transaction ordering rules by identifying transactions by grant signals and thus allows steering of transactions from the first and second devices to the first and second buffer sets respectively. Transactions flowing through the first buffer set would need to follow conventional PCI ordering rules as would transactions flowing through the second buffer set. However, with this invention, transactions in the first buffer set and the second buffer set are allowed to be unordered relative to each other. This results in improved performance since a read transactions from the first device only has to push or pull posted memory write data in the first buffer set, allowing other buffer sets to be unaffected. Additionally, performance is improved since transactions flowing through one buffer set can be essentially unaffected and unordered relative to transactions flowing through another buffer set.

The second application of the present invention further contemplates a computer system that includes processor, a bus bridge coupled to the processor via a primary bus, a system memory coupled to the primary bus, and first and second peripheral devices coupled to the bus bridge via a secondary bus. The bus bridge includes steering logic and a buffer pool comprised of first and second buffer sets. The steering logic is configured to store transactions received from the first and second peripheral devices in the first and second buffer sets respectively. The bridge is configured to push posted memory write transactions stored in the first buffer set onto the primary bus ahead of a read request transaction from the first peripheral device without affecting the transactions stored in the second buffer set. The bridge is preferably configured to arbitrate mastership of the secondary bus among the peripheral devices in response to first and second request signals received by the bridge from the first and second peripheral devices respectively. The bridge is further configured to produce first and second grant signals to the first and second peripheral devices respectively, to indicate the result of the arbitration of the secondary bus. The steering logic is configured to receive the grant signals and determine the source of a subsequent transaction on the secondary bus. The transactions received from the first and second peripheral devices include posted write transactions which are required by the bus specification to be executed in order. Other transactions received from the first and second peripheral device can also include delayed read requests, delayed read completions, delayed write requests, and delayed write completions. Detailed definitions of all of these transaction types are included in the PCI specifications.

The second application of the present invention still further contemplates a method of executing read requests through a bus bridge. A first posted memory write transaction is received from a first peripheral device and its source identified. Upon identifying the first transaction's source, a first buffer set is selected and the first transaction posted therein. A second posted memory write transaction from a second peripheral device is then received, its source identified, a second buffer set selected, and the second transaction stored in the second buffer set. The first posted memory write transaction is then pushed from the first buffer set in response to receiving a read request transaction from the first peripheral device while the second posted memory write transaction in the second buffer set is unaffected. In one embodiment, determining the source of the first and second transactions is achieved by receiving first and second request signals from the first and second peripheral devices respectively and arbitrating mastership of a secondary bus in response to the first and second request signals. In embodiments in which the secondary bus over which the transactions are received is a PCI bus, the first and second transactions include posted memory write transactions. Usually, the pushing of the first posted memory write transaction includes pushing the first transaction out of the bridge towards system memory via the primary bus.

A third application of the present invention contemplates a bus bridge including a buffer pool comprised of a first buffer set and a second buffer set. The first buffer set is associated with a first peripheral device and the second buffer set associated with a second peripheral device. The bridge is configured to receive an interrupt and identify the interrupt source. A buffer set associated with the interrupt source is selected and transactions in the selected buffer set flushed prior to forwarding the interrupt to a processor. The bridge is preferably configured to identify the interrupt source by receiving a first interrupt signal from the first peripheral device and a second interrupt signal from the second peripheral device. Preferably, the bridge is configured to flush the transactions by pushing them into system memory via a primary bus such as a host bus of a processor.

The third application of the present invention further contemplates a system including a processor coupled to a host bus, a system memory, a bus bridge coupled between the host bus and a secondary bus, and first and second peripheral devices coupled to the secondary bus. The bus bridge includes a buffer pool comprised of a first buffer set and a second buffer set. The first buffer set is associated with the first peripheral device and the second buffer set is associated with the second peripheral device. The bridge is configured to receive interrupts. Upon receiving an interrupt, the bridge is further configured to identify the interrupt source, select a buffer set associated with the interrupt source, and flush transactions in the selected buffer set, all prior to forwarding the interrupt to the processor. In one embodiment, the bridge, the first and second peripheral devices, and the secondary bus are compliant with the PCI specification. The bridge is configured in one embodiment such that transactions issued by the first peripheral device are stored in the first buffer set and transactions issued by the second peripheral device are stored in the second buffer set. The bridge is configured in one embodiment to receive unique first and second interrupt signals from the first and second peripheral devices respectively. The flushing of the selected buffer set preferably comprises pushing transactions stored in the selected buffer set into system memory via the host bus.

The third application of the present invention still further contemplates a method of handling interrupts. A first peripheral device is identified as an interrupt source in response to receiving an interrupt. Prior to forwarding the interrupt to a processor, write request transactions stored in a selected buffer set are flushed in response to the identification of the interrupt source wherein the selected buffer set is associated with the interrupt source. After the flushing of the transactions, the interrupt is forwarded to a processor. In this manner, receipt of the interrupt by the processor informs the processor that the selected buffer set has been flushed. In one embodiment, the identifying of the interrupt source includes receiving a first interrupt signal generated by and unique to the first peripheral device. The flushing of transactions posted in the appropriate buffer set comprises pushing the transactions into system memory via a primary bus. The pushing of the transactions stored in the first buffer set is preferably achieved while retaining transactions stored in a second buffer set. A new bit in the adapter that is set during configuration indicates to the device's device driver that the bridge will flush the buffer following the interrupt, prior to forwarding the interrupt to the system. When this bit is set, the device driver will know it does not have to execute a read to the device to flush data following an interrupt. Performance is improved by avoiding the necessity of either a read to memory executed by the device or a read to the device following an interrupt executed by the device driver to push or pull data to memory. These operations would be time consuming compared to simply flushing the write data following the interrupt as described in this invention.

A fourth application of the present invention contemplates a bus bridge with a pool of buffer sets including first and second buffer sets. The bridge includes steering logic for directing transactions issued by a first peripheral device to the first buffer set and transactions issued by the second peripheral device to the second buffer set. The bus bridge is configured to flush the first buffer set in response to identifying the first peripheral device as a target of a read request issued by a processor. In one embodiment, the bus bridge is further configured to receive first and second device select signals from the first and second peripheral devices respectively. In this embodiment, the device select signals control the target of the read request issued by the processor. In one embodiment, the flushing of the first buffer set leaves transactions in all buffer sets other than the first buffer set unaffected. Preferably, transactions flushed by the bus bridge comprise posted memory write cycles.

The fourth application of the present invention still further contemplates a computer system that includes a processor coupled to a system memory via a host bus and a bus bridge coupled between the host bus and a secondary bus. The bus bridge includes a pool of buffer sets including at least first and second buffer sets and first and second peripheral devices coupled to the secondary bus. The bus bridge is configured to identify the first peripheral device as a target of a load request issued by the processor and, in response to the identification, to flush or pull data in the first buffer set ahead of the load completion data, where the first buffer set is associated with the first peripheral device. The first and second buffer sets each include at least one buffer for temporarily storing transactions bound for the system memory via the host bus. In one embodiment, the secondary bus and the bus bridge are compliant with the PCI specification (i.e., a PCI-PCI bridge or a PCI-host bridge). The bridge is most preferably configured such that transactions issued by the first peripheral device are stored in the first buffer set and transactions issued by the second peripheral device are stored in the second buffer set. In one embodiment, the processor is configured to issue the read request in response to receiving an interrupt. The source of the interrupt is preferably the target of the load request.

The fourth application of the present invention still further contemplates a method of flushing or pulling data buffered in a bus bridge. A first peripheral device is identified as the peripheral device targeted by a load request issued by a processor. A first buffer set, which is associated with the first peripheral device, is then selected from a pool of buffer sets in response to identifying the first peripheral device. Write transactions stored in the first buffer set are then flushed or pulled ahead of the load return data in response to the load request while leaving transactions stored in a second buffer set unaffected. Preferably, the identification of the first peripheral device includes receiving first and second device select signals from the first peripheral device and a second peripheral device respectively. These first and second device select signals are asserted by their respective peripheral devices wherein the device select signals are indicative of the target of the load request. In one common embodiment, the processor issues the load request in response to detecting an interrupt to insure that data buffered in the bridge is pulled back to system memory. The source of the interrupt is preferably the target of the load request. The flushing or pulling of the write transactions in the first buffer set includes, in one embodiment, pulling the transactions into a system memory coupled to the processor via a primary bus. The transactions suitably pulled during the flushing or pulling of data of the first buffer include posted memory write transactions.

BRIEF DESCRIPTION OF THE DRAWINGS

Other objects and advantages of the invention will become apparent upon reading the following detailed description and upon reference to the accompanying drawings in which:

FIG. 1 is a simplified block diagram of a system according to a first application of the present invention;

FIG. 2 is a flow diagram of a method according to a first application of the present invention;

FIG. 3 is a simplified block diagram of a bus bridge according to a first application of the present invention;

FIG. 4 is a partial block diagram of a multiple set buffer pool according to the present invention;

FIG. 5 is a simplified block diagram of a system according to a second application of the present invention;

FIG. 6 is a simplified block diagram of a bus bridge according to a second application of the present invention;

FIG. 7 is a partial diagram of a multiple set buffer pool of the bus bridge of FIG. 6;

FIG. 8 is a flow diagram of a method according to a second application of the present invention;

FIG. 11 is a flow diagram of a method according to a third application of the present invention;

FIG. 14 is a flow diagram of a method according to a fourth application of the present invention.

Figure 9:
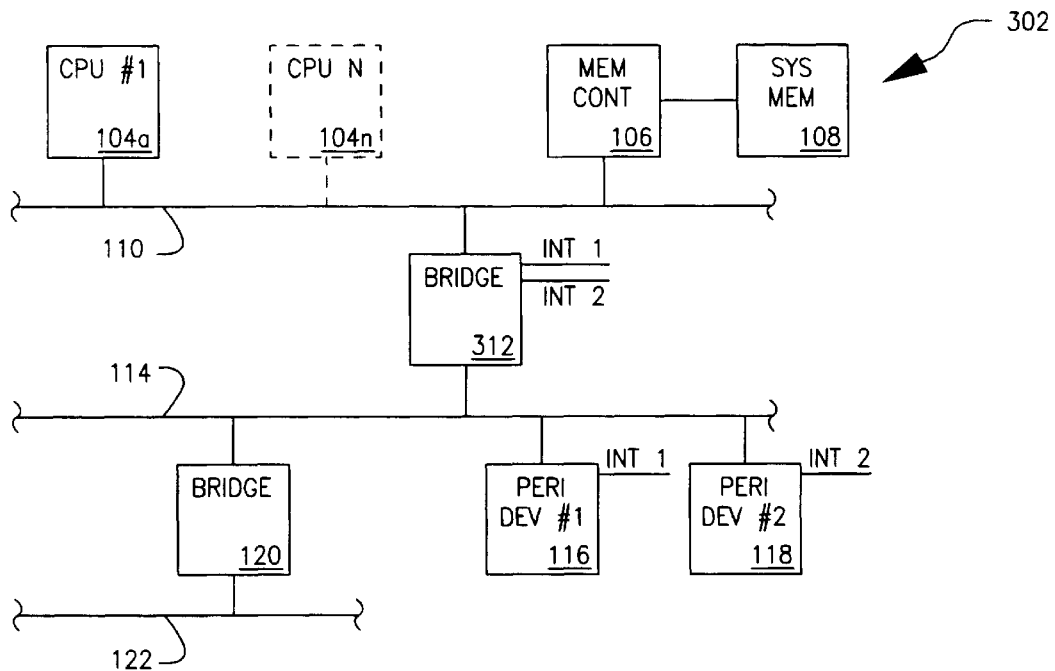
FIG. 9 is a simplified block diagram of a system according to a third application of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning to the drawings, FIGS. 1–4 are related to a first application of the present invention in which a buffer pool within a bus bridge is organized into two or more buffer sets where each of the buffer sets is logically associated with a peripheral device such that transactions originating from a particular peripheral device are stored in the buffer set associated with that peripheral device. This association between peripheral device and buffer set advantageously provides a method of tracking the source or origin of buffered transactions without requiring tag bits or other identifying information.

Referring to FIG. 1, a computer system 102 is presented. Computer system 102 includes a processor 104a connected to a primary bus 110. A system memory 108 is also coupled to primary bus 110 via a memory controller 106. One or more additional processors 104n may be coupled to primary bus 110 to produce a multi-processor system. A representative such additional processor is indicated in phantom by reference numeral 104n (implying a system with n processors). Processors 104a and 104n are generically or collectively referred to herein as processor(s) 104. Each processor 104 may comprise any of a variety of RISC or CISC processors familiar to those skilled in computer design and the present invention does not restrict the designer to a particular architecture. Each processor 104 may include one or more levels of cache memory, which may or may not be integrated within processor 104. Those familiar with computer architecture will appreciate that primary bus 110 comprises the host bus (also referred as the local bus or system bus) of computer system 102 in the configuration depicted in FIG. 1. The host bus is responsible for communicating data, address, and control information among each processor 104 and system memory 108 and for providing and receiving information to and from peripheral devices residing on peripheral busses.

A representative such peripheral bus is indicated in FIG. 1 by secondary bus 114. Secondary bus 114 is coupled to primary bus 110 via a first embodiment of bus bridge 112. Secondary bus 114 preferably provides a specified communication path between bridge 112 and any of a variety of peripheral devices (also referred to as adapters) designed in compliance with the specifications of the bus. In one configuration of widespread application, secondary bus 114 comprises a peripheral component interface (PCI) bus. The PCI bus is a well known bus specification upon which a large number of application devices and cards have been developed. Bus specifications typically specify the physical and electrical characteristics of the bus as well as protocols for sending and receiving information via the bus. System 102 preferably includes a plurality of peripheral devices (two of which are shown in FIG. 1) connected to secondary bus 114. First and second peripheral devices 116 and 118 respectively may comprise a graphics adapter, video controller, disk controller, or any of a large variety of devices. FIG. 1 indicates a second bus bridge 120 coupled between secondary bus 114 and another bus 122. Bus 122 may comprise an additional PCI bus or a bus compliant with another specification, common examples of which are the ISA and EISA bus protocols.

Turning to FIG. 3, a block diagram showing greater detail of bus bridge 112 is presented. In this embodiment, bridge 112 includes a primary bus interface 150 and a secondary bus interface 160 for communication with primary and secondary busses 110 and 114 respectively. Bridge 112 further includes a pool of outbound buffers 162 and a pool of inbound buffers 164 for storing transactions while on route between primary bus 110 and secondary bus 114 (where outbound buffers are designed for storing outbound transactions, i.e., transactions proceeding from primary bus 110 to secondary bus 114 and inbound buffers are used to store inbound transactions). A bus control logic unit 152 of bus bridge 112 includes an arbiter 154 configured to receive unique grant and request signals from each peripheral device coupled to secondary bus 114. In the depicted embodiment, first peripheral device 116 is configured to produce a first request signal (REQ1) 117a and receive a first grant signal (GNT1) 119a while second peripheral device 118 is configured to produce a second request signal (REQ2) 117b and receive a second grant signal (GNT2) 119b. As their names suggest, REQ1 117a and REQ2 117b are used to signal bridge 112 that the appropriate device is requesting mastership of secondary bus 114. If one or more REQ# signals are asserted and received by bridge 112, arbiter 154 is designed to decide which if any of the requesting devices is given permission to obtain mastership of secondary bus 114. Arbiter 154 informs the requesting peripheral devices of the result of the arbitration process by asserting the appropriate GNT# signal (while presumably de-asserting all other GNT# signals). The GNT# signals produced by arbiter 154 are routed to a steering logic unit 156 of bridge 112. Steering control 156, by deciphering the incoming GNT# signals, determines which peripheral device was granted mastership of secondary bus 114. The output of steering control 156 is passed to secondary bus interface 160 to control the storing or buffering of incoming transactions. More specifically, inbound buffer pool 164, as shown in greater detail in FIG. 4, includes two or more buffer sets (of which two are shown, namely, first buffer set 166 and second buffer set 168. Steering control 156 directs incoming transactions to specific buffer sets within inbound buffer pool 164. For example, if first peripheral device 116 is granted bus mastership, steering control 156 directs subsequent incoming transactions to first buffer set 166 of inbound buffer pool 164. Each buffer pool within inbound buffer pool 164 includes one more buffers 170 (of which several such buffers are depicted in FIG. 4 and indicated by reference numerals 170a through 170d) for temporary storage of transactions in transit from secondary bus 114 to primary bus 110. By logically associating sets of buffers within inbound buffer pool 164 with particular peripheral devices on secondary bus 114, the present invention is able to convey the origin or source of buffered transactions despite the lack of tag bits or other indicia of origin. The use of tag bits to achieve the result achieved by the present invention would undesirably conflict with the PCI specification, which does not provide for nor support tag bit information on the PCI bus.

The logical association between buffer sets and peripheral devices as described in the foregoing discussion facilitates the desirable combining or merging of transactions. Peripheral bus specifications frequently dictate strict ordering of certain types of transactions. The PCI specification, as an example, requires strict in-order execution of posted memory write transactions and further prohibits other transactions such as delayed read requests and delayed read completions from bypassing posted memory write cycles. In bus bridges wherein the buffer pool is organized as one common pool accessible by all peripheral devices, such strict ordering requirements substantially diminish opportunities for combining or merging of transactions. In contrast, associating buffer sets with peripheral devices encourages such activity. If, for example, a first posted write transaction is issued by first peripheral device 116 and a second transaction, such as a posted memory write, is thereafter issued by second peripheral device 118, the first and second transactions would be buffered in a conventionally arranged bus bridge with the second transaction stored in a buffer immediately following the first transaction. The requirement of executing the second transaction in order, coupled with the absence of information indicating the origin of the second transaction, effectively prevents bridge 112 from attempting to combine the first transaction with transactions issued after the second transaction.

In the present invention, however, the first and second transactions would be directed to separate buffer sets, with the first transaction being stored in first buffer set 166 and the second transaction being stored in second buffer set 168. The posted memory write transaction issuing from second peripheral device 118 is effectively transparent to first buffer set 166 and the opportunity for combining or merging transactions within first buffer set 166 is appreciably enhanced. Using the example in which the second transaction is a posted memory write transaction from second peripheral bus, a third transaction originating from first peripheral device 116 could be combined with the first transaction within first buffer set 166 because the transaction stored in second buffer set 168 is assured by the design of bridge 112 to have originated from a different peripheral device than the transactions in first buffer set 166. Combining or merging transactions can beneficially improve system performance by promoting efficient usage of primary bus 110. If the first and third transactions, for example, each access one or a relatively few number of consecutive ascending address locations, combining or merging the two transactions into one transaction whenever possible could eliminate one of the transactions thereby consuming less of the available bandwidth of the primary bus. This efficiency is particularly desirable in architectures where accessing a relatively small portion of system memory is achieved using a read-modify-write cycle in which a larger portion of memory (such as a portion of memory compatible with a line size of the processor's cache) containing the targeted memory address is read, the targeted memory location portion modified or written with the targeted data, and finally stored back in system memory 108. The longer cycle time of read-modify-write cycles creates a strong incentive to combine transactions wherever possible to reduce the number of separate accesses over primary bus 110 and to improve the efficiency of each such access. Ideally, ascending sequential address transactions are combined or merged until an entire line of memory is targeted with each access thereby eliminating the need for inefficient read modify write cycles. By facilitating combining of transactions, system 102 and bridge 112 are made less sensitive to the size of memory transfers from peripheral devices on secondary bus 114. If a particular peripheral device tends to break long memory transfers into multiple inefficient short transfers, bridge 112 combines or merges the separate smaller transactions as appropriate permitting the bridge to send a long memory transfer to primary bus 110 typically employing an efficient transaction such as a burst memory transaction in which multiple data phases follow a single address phase.

Thus, it will be appreciated that the embodiment of the present invention presented in FIGS. 1 and 3 contemplates a method 128 (shown in the flow diagram of FIG. 2) of buffering or storing transactions in a bus bridge. A first transaction is received and, in response, its source identified as a first peripheral device in step 130. This identification is preferably accomplished with the aid of the unique GNT# signals 119 per peripheral device and the steering control 156 discussed previously. Based upon the identification of the first peripheral device 116, a first buffer set 166 is selected from two or more buffer sets contained in a buffer pool 164 in step 132. A second transaction is then received and its source identified as a second peripheral device 118 in step 134. This second transaction might suitably comprise a posted memory write cycle or other in-order transaction that reduces or eliminates the opportunity to merge or combine the first transaction with subsequent transactions. Based upon the identification of second peripheral device 118, the second transaction is stored in a second buffer set 168 of buffer pool 164 in step 142. In this embodiment of the invention emphasizing the facilitation of combining and merging of buffered transactions, method 128 might further include receiving a third transaction, identifying the source of the third transaction as first peripheral device 116, and storing the third transaction in first buffer set 166 in steps 136 and 138. Thereafter, the first and third transactions are combined or merged if possible within first buffer set 166 in step 140 to promote improved performance and efficiency.

Turning now to FIGS. 5 through 8, a second application of the invention is presented emphasizing bus performance during or ahead of a direct memory access (DMA) read cycles in which a peripheral device residing on second bus 114 accesses system memory 108. More specifically, computer system 202 as presented in FIG. 5 includes one or more processor units 104 tied to primary bus 110 as well as a system memory 108 coupled to primary bus 110 through memory controller 106, all as discussed above with respect to FIGS. 1 through 4. In system 202, however, a bus bridge 212 couples primary bus 110 and secondary bus 114. Bus bridge 212 utilizes the buffer pool architecture of bus bridge 112 to achieve performance improvements during DMA read requests by reducing the number of transactions that must be pushed onto primary bus 110 ahead of the read request. Typically, peripheral bus specifications, such as the PCI specification, prohibit DMA read requests from bypassing previous posted memory write transactions. The restriction provides a simple mechanism for insuring that all posted write transactions are pushed into system memory prior to executing an interrupt. This requirement, however, negatively impacts system performance in conventionally designed bus bridges because of the unnecessarily large number of posted write transactions that must be pushed ahead of the read request. Because conventional bridges buffer transactions from multiple peripheral devices in a common buffer pool, the source of buffered transactions is typically not discoverable once the transactions are posted. To insure valid system memory data, the conventional bridge must push all posted writes into system memory under the worst case assumption that all posted write transactions residing in the common buffer pool originated with the peripheral device currently requesting a DMA read. The present invention overcomes this performance limiting characteristic of conventional bridge design by utilizing the logical association between the individual buffers sets of inbound buffer pool 264 and the peripheral devices on secondary bus 114 (two of which are shown in FIG. 5, namely first peripheral device 216 and second peripheral device 218.

Turning to FIG. 6, bus bridge 212 is presented in block diagram format disclosing greater detail than FIG. 5. Bus bridge 212 includes an inbound buffer set 264 organized into two or more buffer sets (shown in FIG. 7), of which first buffer set 266 and second buffer set 268 are shown. Each buffer set in buffer pool 264 includes at least one buffer 270 preferably configured to temporarily store or buffer transactions originating from secondary bus 114 and destined for primary bus 110. An arbiter 254 is configured to receive request signals and produce grant signals in a manner similar to arbiter 154 of FIG. 3. The grant signals are passed to steering logic 256, which informs secondary bus interface 260 which of the buffer sets in buffer pool 264 is associated with the current master of secondary bus 114. In addition, bridge 212 includes a transaction execution state machine 220 for each of the buffer sets that determines the order of execution on primary bus 110 of transactions flowing through buffer sets 264. Upon detecting an incoming DMA read request, transaction execution state machine 220 assures that write transactions in the particular buffer set associated with the current master of secondary bus 114 are pushed ahead of the DMA read transaction. A benefit is achieved by pushing only a portion of the total number of posted write transactions in buffer pool 264. As a simple example, first buffer set 266 may be associated with first peripheral device 216 and may include a single posted write transaction while second buffer set 268 may be associated with second peripheral device 218 and may also include a single write transaction. If first peripheral device 216 issues a DMA read request (whether as part of a sequence in preparation for a subsequent interrupt event or for any other purpose) bridge 212 pushes the posted write transaction in first buffer set 266, while the posted write transaction within second buffer set 268 is unaffected. In this simplest of examples, the number of posted write cycles that bridge 212 must push ahead of the DMA read request is cut in half from an architecture in which all posted writes are pushed ahead of the read request.

Thus, the application of the present invention emphasized in bus bridge 212 of FIGS. 5 through 7 contemplates a method 228 as shown in the flow diagram of FIG. 8. In a first step 230, a first transaction originating from a first peripheral device such as first peripheral device 216 (shown in FIG. 6) is received and stored in a first buffer set 266 (first buffer set 266 being logically associated with first peripheral device 216). In step 232, a second transaction originating form a second peripheral device such as second peripheral device 218 (shown in FIG. 6) is stored in a second buffer 268 of buffer pool 264 (second buffer set 268 being associated with second peripheral device 218). To emphasize the benefit of method 228, the first and second transactions preferably include posted memory write transactions or any other transaction required to be executed in strict order. After the first and second transactions have been stored in the appropriate buffer sets, first peripheral device 216 issues a DMA read request. The origin of the read request is detected by arbiter 254 and passed to steering logic 256 while transaction execution state machine 220 determines the order in which transactions execute on primary bus 110. With this information, transaction execution state machine 220 pushes all posted write transactions in first buffer set 266 into system memory 108 via primary bus 110 and memory controller 106 ahead of the read request transaction. The second posted write transaction, which is stored in second buffer set 268, and any other transactions stored in any buffer set other than first buffer set 266 are unaffected by the read request of first peripheral device 216. By eliminating the time that would otherwise be required to push all posted writes in inbound buffer pool 264, the performance of system 202 and bridge 212 ahead of DMA read requests is correspondingly improved. Transaction ordering rules defined in transaction execution state machine 220 are essentially relaxed compared to convention PCI since the ordering rules apply only to each buffer set but not between buffer sets, allowing improved performance.

Figure 10:
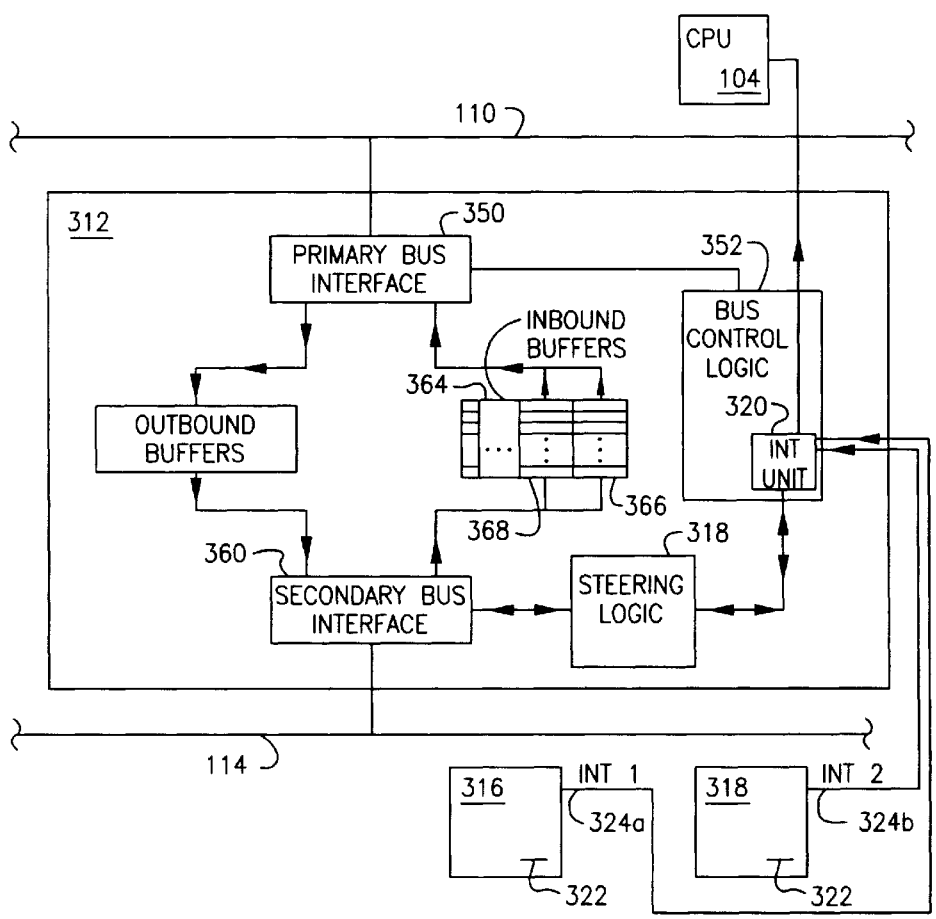
FIG. 10 is a simplified block diagram of a bus bridge according to a third application of the present invention.

Turning now to FIGS. 9 through 11, an application of the present invention emphasizing improved interrupt response is presented. Bus protocols typically provide a definition for hardware interrupts initiated by peripheral devices. In the PCI specification, for example, a hardware interrupt is a sideband signal relative to data transfers on the bus. Because the interrupt signal is not required to pass through the layers of busses and bridges that data must traverse, the interrupt may, and often does, arrive at the processor before the data has been arrived in system memory. Thus, receipt of an interrupt by the processor does not guarantee that all data associated with the interrupt is available in system memory. If, for example, a processor instructs a hard disk on a peripheral bus to transfer a block of data from the hard disk to system memory and the hard disk generates an interrupt after completing the task, the architecture does not prevent the interrupt from reaching the processor before the data is saved in system memory. Thus, the interrupt handling procedures of conventionally designed systems must provide a method of insuring that the data has reached its final destination.

One commonly invoked method of insuring data integrity after an interrupt requires the peripheral device driver to initiate a load from the interrupting peripheral device. This processor initiated load produces a delayed read completion transaction which cannot bypass posted memory write transactions. This results in all posted write transactions in the buffer pool of the bus bridge being pulled ahead of the read completion data thereby insuring that all data associated with the interrupt is stored back in system memory. Unfortunately, the processor initiated load request required to force posted data into system memory has a negative impact on system performance because the load request to I/O is a time consuming process for the processor. The application of the present invention emphasized in FIGS. 9 through 11 addresses this problem with an internal bus organization and architecture that delays the forwarding of the interrupt signal to the processor until the bridge pushes the relevant transactions into system memory. Coupled with the multiple buffer set buffer pool introduced in the preceding discussion, this embodiment of the invention provides the potential for a significant improvement in system performance by eliminating or reducing the amount of data that must be pushed into system memory ahead of the interrupt and by eliminating the need for the processor initiated load cycle described.

More specifically, this application of the present invention contemplates a computer system 302 as shown in FIG. 9. System 302 includes one or more processors 104 coupled to a primary bus 110. A system memory 108 is coupled to primary bus 110 through memory controller 106. A bus bridge 312 is coupled between primary bus 110 and a secondary bus 114. In one embodiment, secondary bus 114 comprises a PCI bus. Two or more peripheral devices are connected to secondary bus 114. FIG. 9 depicts two such peripheral devices, first peripheral device 116 and second peripheral device 118. As in the previous embodiments, system 302 may include one or more additional bridges such as bridge 120 for coupling to additional busses. Turning to FIG. 10, bridge 312 of system 302 is presented in greater detail. Bridge 312 includes primary and secondary bus interfaces 350 and 360 respectively to communicate data, address, and control information to and from primary bus 110 and secondary bus 114. A bus control logic unit 352 of bridge 312 includes an interrupt unit 320. Interrupt unit 320 is configured to receive unique interrupt signals from each of the peripheral devices on peripheral bus 114. In the depicted embodiment wherein two peripheral devices are shown, interrupt unit 320 is shown as configured to receive a first interrupt signal (INT1) 324a from first peripheral device 316 and a second peripheral device (INT2) 324b from second peripheral device 118. In the preferred embodiment, interrupt signals 324 are sideband signals provided directly to interrupt unit 320. Interrupt unit 320 determines the interrupting device by inspecting interrupt signals 324 and, based upon its determination of the originating device, drives steering logic 318. Steering logic 318 is configured to receive the interrupt source information produced by interrupt unit 320. Thus, steering logic 318 is informed by interrupt unit 320 of both the presence and origin of an interrupt signal. Steering logic 318 provides control signals to secondary bus interface unit 360 based upon the information from interrupt unit 320. Secondary bus interface 360 is configured to respond to the control signals from steering logic 318 by initiating a buffer flush of the buffer set within buffer pool 364 associated with the interrupting device. If, as an example, the interrupt is initiated by first peripheral device 316, secondary bus interface 360 pushes the required transactions in first buffer set 366 into system memory via primary bus 110.

Interrupt unit 320 is further configured to transmit the interrupt to the appropriate processor 104 only after the appropriate buffer set has been flushed of posted write transactions and any other transactions required by the bus specification to be executed in strict order. Because bridge 312 is able to determine the peripheral device that initiates the interrupt event, transactions residing in buffer sets not associated with the initiating peripheral device need not be pushed onto primary bus 110 thereby saving execution time that would otherwise be consumed unnecessarily pushing back transactions associated with other peripheral devices onto primary bus 110. Moreover, using this embodiment of the present invention, processor 104 is no longer required to initiate a load across primary and secondary busses 110 and 114 respectively as part of an interrupt handling routine. In one embodiment, peripheral devices such as first and second peripheral devices 116 and 118 include a configuration bit 322 which can be set via software, typically during system configuration, to inform the device driver that bridge 312 supports this partial flush back function. The device driver can then be tailored to test configuration bit 322. If configuration bit 322 indicates that bridge 312 supports the partial flush in response to interrupt function, the device driver will not initiate a processor load in response to an interrupt. Instead the device driver is able to operate under the assumption that data in system memory is valid as soon as the interrupt is detected by processor 104.

Turning now to FIG. 11, a flow diagram representing a method 328 of handling interrupts according to the application of the present invention presented in FIGS. 9 and 10 is shown. In a first step 330 of method 328, an interrupt is received, preferably by a bus bridge of a computer system, and the source of the interrupt identified. In response to the detection of an interrupt and the identification of the interrupting device, a buffer set associated with the interrupting device is selected. The selected buffer set is then flushed in step 332 by pushing transactions contained in the selected buffer set to system memory 108 via primary bus 110. Preferably the transactions pushed onto primary bus 110 include posted memory write transactions. In step 334, the interrupt is then forwarded to the appropriate CPU. In the preferred embodiment, transactions buffered in the non-selected buffer sets within the buffer pool are unaffected by the flushing of the selected buffer set. If, for example, first peripheral device 316 initiates an interrupt and first peripheral device 316 is associated with first buffer set 366 of inbound buffer pool 364, posted memory write transactions stored in second buffer set 368 (and all other non-selected buffer sets) are not pushed onto primary bus 110 as they would be in a conventionally designed bridge with a common buffer pool accessible to each peripheral device.

Figure 12:
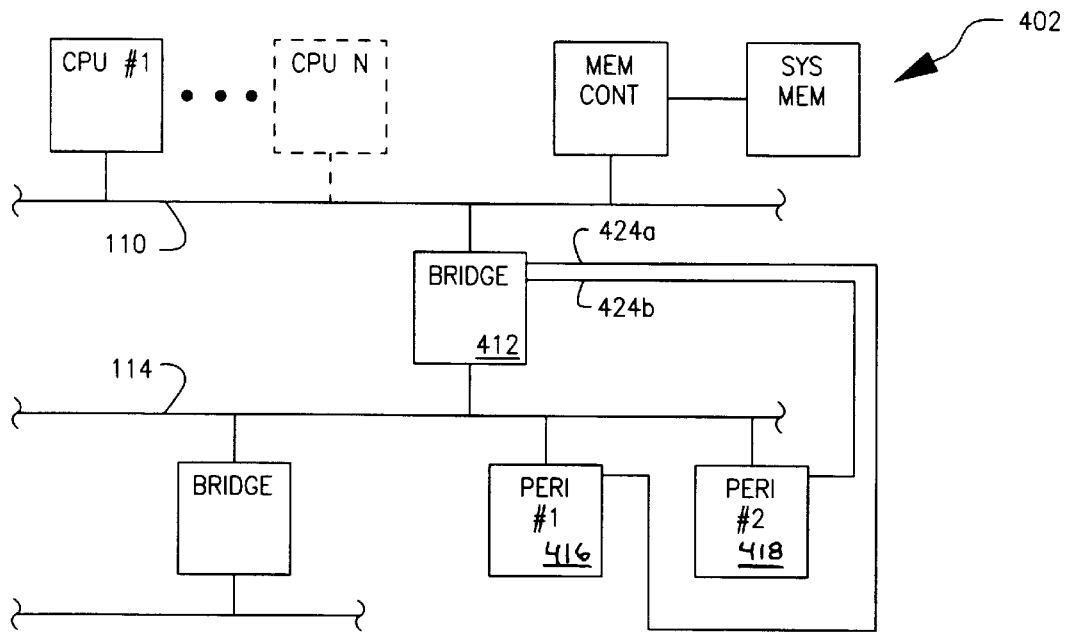
FIG. 12 is a simplified block diagram of a system according to a fourth application of the present invention.
Figure 13:
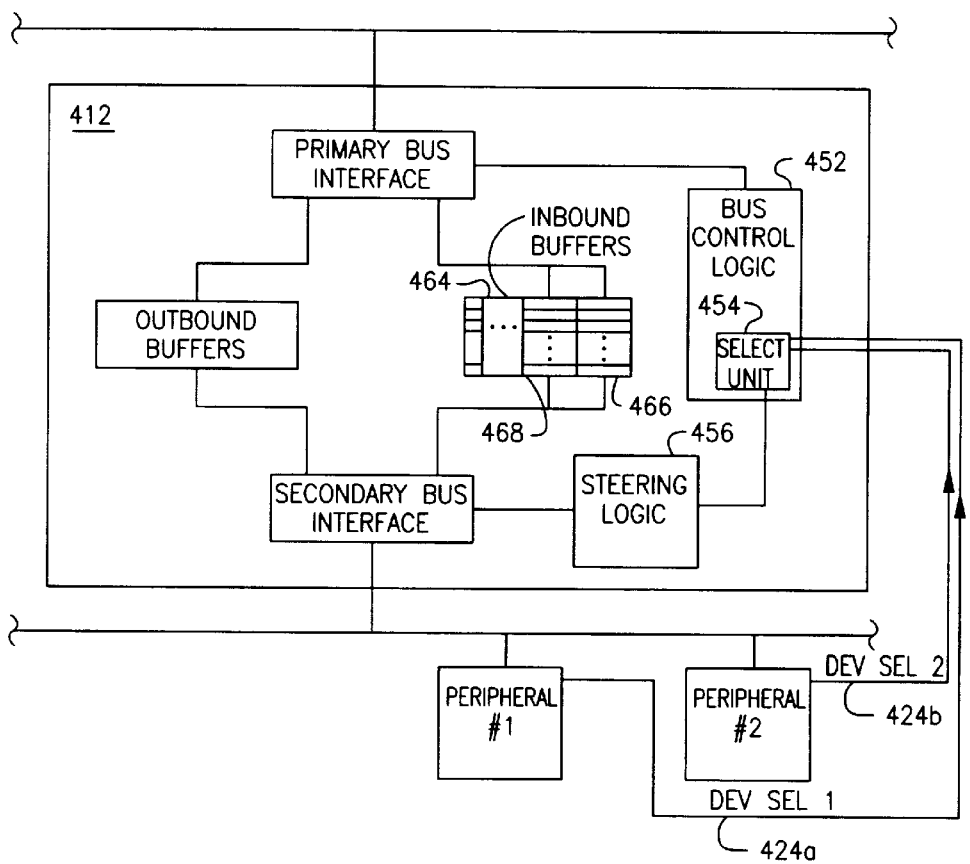
FIG. 13 is a simplified block diagram of a bus bridge according to a fourth application of the present invention.

Turning now to FIGS. 12 through 14, a fourth application of the present invention is presented emphasizing performance improvements achieved by partially flushing a buffer pool in response to a load request to an I/O device. Bus bridges, such as PCI bridges, are frequently capable of combining and merging transactions to improve system performance, but bridge buffer organization coupled with bus ordering rules frequently inhibit the ability to combine or merge transactions. When a peripheral device initiates an interrupt, one of the ways in which the system can insure data validity is to execute a processor initiated load operation to the interrupting device. This load operation, as discussed previously, forces posted write data buffered in the bridge buffers to system memory thereby insuring data validity once the load data is returned to the processor. In conventional bus bridge architectures, however, the processor initiated load cycle pulls all posted write data out of the bridge buffer, even data associated with peripheral devices that did not initiate the interrupt. This severely hampers opportunities to combine transactions in the bridge buffer and increases the time required to respond to the interrupt.

Referring to FIG. 12, a system 402 is presented including a processor 104, primary bus 110, memory controller 106, and system memory 108 all as seen and discussed previously. System 402 includes a bus bridge 412 coupled to a secondary bus 114 to which two or more peripheral devices, including first peripheral device 416 and second peripheral device 418 are connected. As shown in greater detail in FIG. 13, bridge 412 resides between primary bus 110 and secondary bus 114. In the embodiment depicted in FIG. 12, primary bus 110 is the host bus of processor 104. In other embodiments, primary bus 110 may comprise another peripheral bus such as another PCI bus. Whether bridge 412 is acting as a host-PCI bridge, a PCI-PCI bridge, or in some other configuration, bridge 412 is configured to receive select signals 424 from each peripheral device on secondary bus 114. Two of these dedicated select signals, first select signal (SEL1) 424a corresponding to first peripheral device 416 and second select signal (SEL2) 424b corresponding to second peripheral device 418, are shown in the figure. The select signals 424 are asserted by their corresponding peripheral devices if the corresponding peripheral device is the target of a load operation executed by processor 104. In an embodiment in which secondary bus 114 is a PCI bus, a processor load operation that proceeds through bus bridge 412 pulls posted write data from the bridge's buffer pool to insure that data in system memory 108 is valid when processor 104 receives load completion data from the targeted peripheral device. The present invention takes advantage of the multiple buffer set organization of inbound buffer pool 464 and information provided by select signals 424 to pull posted write data from only the buffer set associated with the targeted peripheral device. If, as an example, processor 104 executes a load cycle to first peripheral device 418, the peripheral device, upon detecting that it has been selected, asserts its corresponding select signal, namely SEL1 424a. Select unit 454 within bus control logic unit 452 of bridge 412 receives the select signals from devices connected to secondary bus 114 and sends information to steering logic 456, which controls the secondary bus interface to route the load completion data through First buffer set 466 (assuming that first buffer set 466 has been logically associated with first peripheral device 416). By steering load completion data through the buffer set associated with the peripheral selected by the processor load cycle, posted write data within the selected buffer set, and only the selected buffer set, is pulled from buffer pool 464. By reducing the number of posted write transactions that must be pulled in response to a processor load cycle through bridge 412, this embodiment emphasizes improved performance in responding to processor load cycles. Such an improvement is useful in embodiments in which hardware interrupts are handled by initiating processor load cycles to the interrupting device and when processor load cycles are used to check device status. In such systems, the device driver forces a processor load to check device status or, upon detecting an interrupt, to pull the posted data into system memory. Thus the embodiment of the present invention depicted in FIGS. 12 and 13 improves interrupt response time or the time required to check device status while simultaneously increasing the opportunities for merging or combining of transactions in the bridge's buffer pool 464.

Turning to FIG. 14, a flow diagram of a method 428 is presented emphasizing the improved interrupt response or device status checking features of system 402 and bridge 412 presented in FIGS. 12 and 13. In a first step 430, a first peripheral device 416 is identified as the peripheral device targeted by a processor load cycle. The load cycle may be in response to a hardware interrupt or to check device status. A first buffer set from the pool of buffer sets is selected according to the identification of the selected peripheral device. In the case of a load initiated in response to an interrupt, the device targeted by the load device is the source of the interrupt. Load completion data is then routed through the selected buffer set to flush posted write data in the selected buffer set in system memory of the computer system. Posted write transactions in the remaining buffer sets are unaffected and need not be pulled from the buffer pool. Eliminating the need to pull these transactions improves interrupt response time and the time required to check device status and increases opportunities for combining or merging transactions in the buffer pool.

It will be apparent to those skilled in the art having the benefit of this disclosure that the present invention contemplates management of a buffer pool within a bus bridge by organizing the buffer pool into multiple buffer sets and associating the buffer sets with specific peripheral devices to provide an effective mechanism for tracking the origin of transactions buffered in the buffer pool. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A bus bridge coupled between primary and secondary busses, comprising:
   a buffer pool including at least first and second buffer sets wherein the first buffer set is associated with a first peripheral device and the second buffer set is associated with a second peripheral device;
   steering logic configured to direct transactions received from first and second peripheral devices via a secondary bus to the first and second buffer sets respectively wherein the buffer set in which a transaction is pending indicates the peripheral device from which the transaction originated; and
   wherein the bridge is configured to push transactions posted in the first buffer set without altering the second buffer set in response to receiving a read request from the first peripheral device, whereby the time to service the read request is independent of the contents of the second buffer set.

2. The bridge of claim 1, wherein the steering logic is configured to receive first and second grant signals produced by arbitration logic of the bridge, wherein the first and second grant signals indicate the source of a subsequent transaction to be received via the secondary bus.

3. The bridge of claim 1, wherein the transactions pushed in response to the read request comprise posted write transactions.

4. The bridge of claim 1, wherein the bridge and the secondary bus are compliant with the PCI protocol.

5. The bridge of claim 4, wherein the primary bus comprises a host bus coupled to a central processing unit.

6. The bridge of claim 4, wherein the primary bus comprises a PCI bus.

7. A computer system comprising:
   a central processing unit;
   a bus bridge coupled to the central processing unit via a primary bus;

a system memory coupled to the primary bus; and first and second peripheral devices coupled to the bus bridge via a secondary bus; wherein the bus bridge includes steering logic and a buffer pool comprised of first and second buffer sets wherein the first buffer set is associated with the first peripheral device and the second buffer set is associated with the second peripheral device wherein the steering logic is configured to store transactions received from the first and second peripheral devices in the first and second buffer sets respectively wherein the buffer pool in which a transaction resides indicates the peripheral device from which the transaction originated, and further wherein the bridge is configured to push the transactions stored in the first buffer set onto the primary bus ahead of a read request from the first peripheral device without affecting the transactions stored in the second buffer set.

8. The system of claim 7 wherein the secondary bus comprises a PCI bus.

9. The system of claim 7, wherein the bridge is further configured to arbitrate mastership of the secondary bus among the peripheral devices.

10. The system of claim 9, wherein the arbitration is responsive to first and second request signals received by the bridge from the first and second peripheral devices respectively.

11. The system of claim 9, wherein the bridge is further configured to produce first and second grant signals to the first and second peripheral devices respectively, the grant signals indicative of the result of the arbitration of the secondary bus.

12. The system of claim 9, wherein the steering logic is configured to receive the grant signals and identify the source of a subsequent transaction on the secondary bus in response thereto.

13. The system of claim 7, wherein the transactions received from the first and second peripheral devices comprise posted write transactions.

14. A method of executing read requests through a bus bridge, comprising:

receiving a first transaction and, responsive thereto, identifying a first peripheral device as the source of the transaction;

responsive to the identification of the first peripheral device, selecting a first buffer set and posting the first write transaction therein, whereby the first buffer set corresponds to transactions issued by the first peripheral device;

receiving a second transaction and, responsive thereto, identifying a second peripheral device as the source of the transaction;

responsive to the identification of the second peripheral device, selecting a second buffer set and posting the second write transaction therein; and pushing the first transaction from the first buffer set in response to receiving a read request from the first peripheral device while the second transaction in the second buffer set is unaffected, whereby execution time of read requests from the first peripheral device is independent of transactions posted in the second buffer set.

15. The method of claim 14, wherein the identification of the source of the first and second transactions comprises receiving first and second request signals from the first and second peripheral devices respectively.

16. The method of claim 15, wherein the identification of the source further comprises arbitrating mastership of a secondary bus in response to the first and second request signals.

17. The method of claim 14, wherein the receiving of the first and second transactions comprises receiving the transactions via a secondary bus.

18. The method of claim 17, wherein the secondary bus comprises a PCI bus.

19. The method of claim 14, wherein the first and second transactions comprise posted memory write transactions.

20. The method of claim 14, wherein the pushing of the first transaction comprises pushing the first transaction into system memory via a primary bus.

* * * * *